Dec. 14, 1926.

W. FARRELL

MULTIPLE MOTOR

Filed July 27, 1923  2 Sheets-Sheet 1

1,610,666

Witnesses
George A. Gruss

Inventor
William Farrell
By Joshua R. H. Potts
His Attorney

Dec. 14, 1926.         W. FARRELL         1,610,666
MULTIPLE MOTOR
Filed July 27, 1923      2 Sheets-Sheet 2

Patented Dec. 14, 1926.

1,610,666

UNITED STATES PATENT OFFICE.

WILLIAM FARRELL. OF PHILADELPHIA, PENNSYLVANIA.

MULTIPLE MOTOR.

Application filed July 27, 1923. Serial No. 654,030.

My invention relates to improvements in multiple motors and its object is to provide a multiple motor of an improved construction which will have maximum power capacity and minimum size.

This object, and other advantageous ends which will be described hereinafter, I attain in the following manner, reference being had to the accompanying drawings in which—

Figure 1:
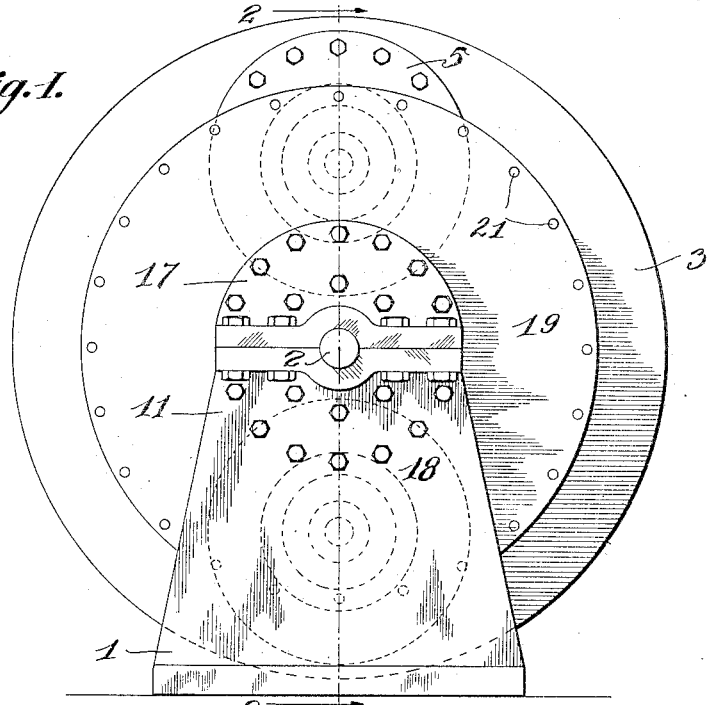
Figure 2:
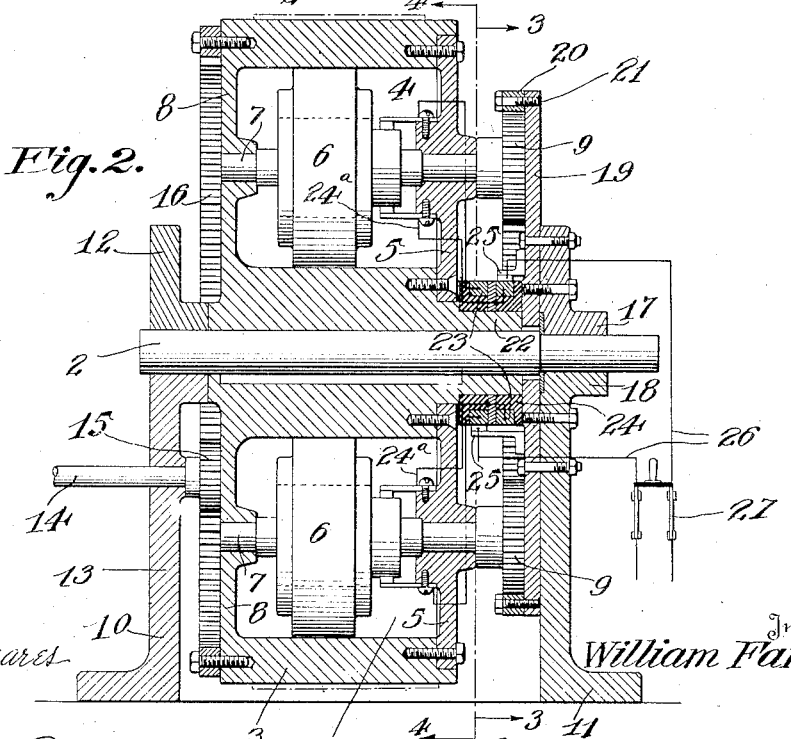
Figure 3:
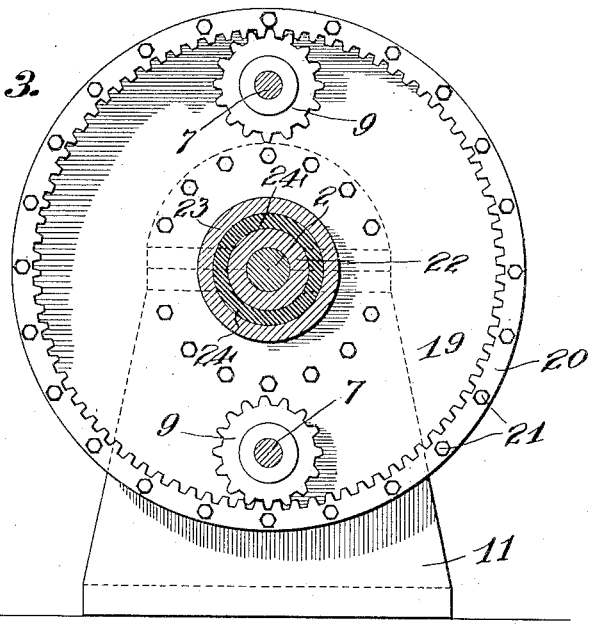
Figure 4:
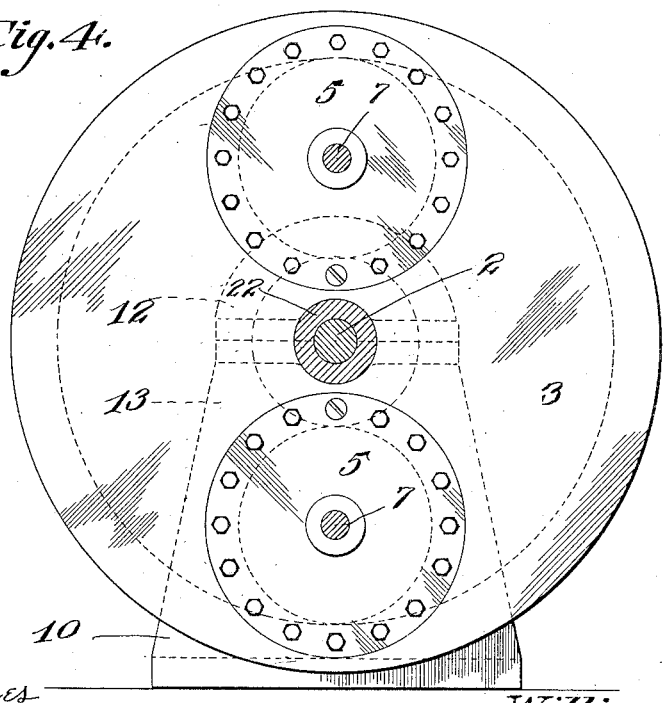

Figure 1 is a side view of a multiple motor constructed in accordance with my invention, Figure 2 a section on line 2—2 of Figure 1, Figure 3 a section on line 3—3 of Figure 2, and Figure 4 a section on line 4—4 of Figure 2.

Referring to the drawings, 1 indicates a support in which is mounted a shaft 2 having fixed thereto a revolving frame 3. The frame is provided with chambers 4 which are covered by plates 5 secured to the frame. A motor 6 is mounted in each chamber and has its armature shaft 7 bearing in the wall 8 of chamber 4 and in plate 5. The end of the shaft 7 projects out of the frame and has a pinion 9 fixed thereto. The support 1 comprises sectional uprights 10 and 11 disposed at opposite sides of the revolving frame. The upright 10 is composed of an upper section 12 bolted to a lower section 13. The lower section 13 has a power transmitting shaft 14 bearing therein, the end of which carries a pinion 15 which meshes with an internal gear 16 fixed to the revolving frame. The upright 11 is composed of an upper section 17 bolted to a lower section 18. A disk 19 is bolted to upright 11 and has an internal circular rack 20 secured thereto by bolts 21. The circular rack is disposed concentric with the revolving frame and parallel thereto so that pinions 9 will mesh therewith while the revolving frame rotates. The revolving frame is provided with an extension 22 on which are mounted electric conducting rings 23 and insulated therefrom by insulation 24. An electrical connection between the motors and rings 23 is made through wires 24ª. Brushes 25 are secured to disk 19 in any suitable manner and contact with the rings. A feed line 26 is connected to the brushes through any suitable switch 27.

In the normal operation of my improved multiple motor, the idle mass of an ordinary motor is utilized to serve in a similar manner as the rim of a fly wheel. The internal circular gear rack 20 in conjunction with the disk 19 serve as a guard or cover for the pinions to protect the operator from injury and at the same time give the pinions a maximum purchase in their driving movement, thereby requiring comparatively small motors of high speed to transmit their power to the revolving body which rotates at a low speed, thus doing away with reduction gears, belts, pulleys and other reducing mechanism. If desired, instead of the power transmitting shaft being geared to the revolving frame, a belt may be directly connected to the periphery of the frame as shown in dot-and-dash lines, or a pulley may be connected to the end of shaft 2.

A multiple motor constructed in the manner above described requires motors of low horse power; will maintain a practically constant speed of rotation under all loads for which it is rated, and combines maximum power capacity with minimum size.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In a multiple motor, a revolving frame provided with a plurality of chambers and an extension; a shaft keyed to the frame; upright bearing supports for the shaft; a plurality of plates secured to the frame for closing the chambers; an electric motor mounted in each chamber and having its armature shaft bearing in the wall of the chamber and in the plate; a disk secured to one of the supports; an internal circular gear rack secured to the disk; a pinion on each armature shaft meshing with the rack; electric conducting rings mounted on the extension and insulated therefrom; brushes fixed to one of the supports and contacting with the rings, and electrical connections between the rings and the motors.

2. In a multiple motor, a revolving frame provided with a plurality of chambers each at an equal distance from the axis of the frame; means for rotatably supporting the frame; a plate for closing each chamber; a motor, including fields and armature, provided in each chamber and having the armature shaft bearing in the wall of the chamber and in the plate; an internal circular gear rack fixed to the support, and a pinion on each armature shaft meshing with the rack.

In testimony whereof I have signed my name.

WILLIAM FARRELL.